No. 673,592. Patented May 7, 1901.
G. L. ALLEN.
PHARMACEUTICAL IMPLEMENT.
(Application filed Jan. 7, 1901.)
(No Model.)
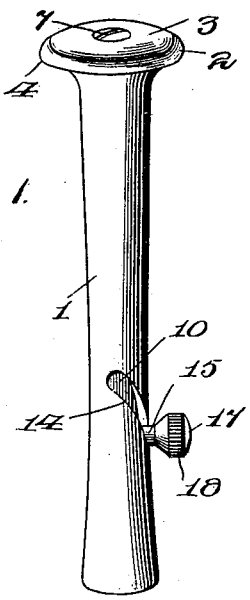
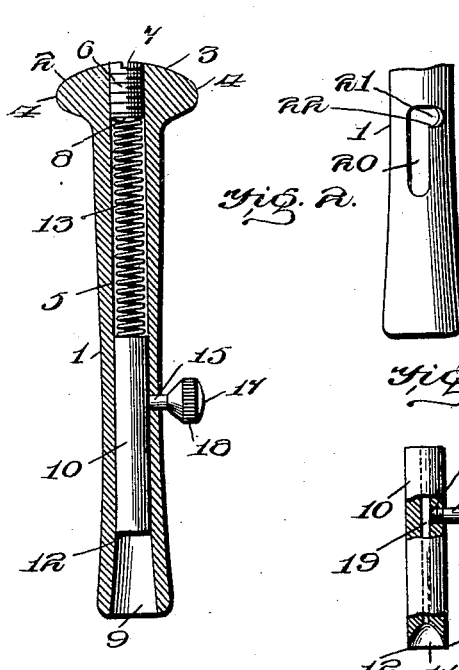
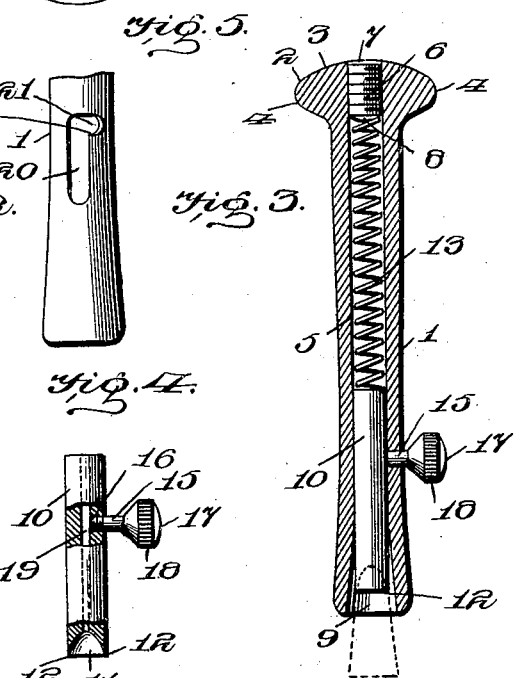
George L. Allen, Inventor

UNITED STATES PATENT OFFICE.

GEORGE LINCOLN ALLEN, OF BRADFORD, PENNSYLVANIA, ASSIGNOR OF ONE-HALF TO WELLINGTON D. HART, OF SAME PLACE.

PHARMACEUTICAL IMPLEMENT.

SPECIFICATION forming part of Letters Patent No. 673,592, dated May 7, 1901.

Application filed January 7, 1901. Serial No. 42,414. (No model.)

*To all whom it may concern:*

Be it known that I, GEORGE LINCOLN ALLEN, a citizen of the United States, residing at Bradford, in the county of McKean and State of Pennsylvania, have invented a new and useful Pharmaceutical Implement, of which the following is a specification.

This invention relates to pharmaceutical implements; and one object in view is to provide a simple, reliable, and efficient implement for grinding and mixing any medicinal preparation in granular or powdered form within a mortar or other suitable receptacle and afterward shaping or compressing the material into the form of a suppository or compressed tablet or triturate for medicinal use.

One of the chief advantages of the present invention resides in the fact that the plunger which forms the base of the suppository-chamber is given a partial rotary or oscillatory movement as the suppository is ejected and as the plunger is retracted, which movement serves to effectively clear the suppository-chamber from any material which may accumulate within or adhere to the walls of said chamber.

Another feature of the invention resides in the particular arrangement of the plunger thrust-spring and the manner of detachably mounting the spring-seat within that end of the handle which is provided with an enlarged pestle-head.

Other objects and advantages of the invention will appear in the course of the subjoined description.

The invention consists in certain novel features and details of construction and arrangement of parts, as hereinafter fully described, illustrated in the drawings, and pointed out in the claims.

In the accompanying drawings, Figure 1 is a perspective view of a pharmaceutical implement constructed in accordance with this invention. Fig. 2 is a central longitudinal section through the same, showing the plunger retracted or drawn inward. Fig. 3 is a similar view taken at about right angles to Fig. 2 and showing the plunger thrown outward in the act of ejecting a suppository, the latter being indicated in dotted lines in said figure. Fig. 4 is a detail view of the plunger, showing the form of the end cavity and the operating devices. Fig. 5 is a detail elevation of the lower portion of the implement, showing a modified form of slot.

Similar numerals of reference designate corresponding parts in all the figures of the drawings.

The device contemplated in this invention is in the nature of a pharmaceutical implement which is adapted for two purposes—namely, as a pestle for grinding and mixing a medicinal preparation, and, secondly, for forming such preparation into suppositories.

In carrying out the invention I employ a handle 1, which is provided at one extremity with an enlargement 2, forming a pestle-head, the same having a convex or rounded outer surface 3 and well-rounded edges or corners 4, said enlargement having the shape of an ordinary pestle-head for enabling any desired medicinal preparation to be ground or pulverized and mixed within the mortar or other suitable receptacle.

The handle 1 is provided with a central longitudinal opening 5, which extends entirely through the same, and that end of the opening adjacent to the head 2 is closed by means of an externally-threaded plug or spring-seat 6, which screws into the internally-threaded end of the opening or bore 5 and is preferably provided with a nick 7, adapted to be engaged by a screw-driver, whereby the plug or screw-seat may be removed when it is desired to gain access to the interior parts of the implement. The plug or seat 6 has its inner end rounded, as at 8, to form a smooth centering bearing or seat for the adjacent end of the plunger thrust-spring. The opposite end of the opening or bore 5 is flared to form a suppository-chamber 9, the walls of which diverge toward the extremity of the implement. Within the suppository-chamber and bore 5 is mounted a reciprocatory plunger 10, provided at its outer end with a cavity or recess of semi-oval or half-round shape, providing the outer end of the plunger with an annular knife-edge 12. The cavity 11 when the plunger is drawn inward forms the base of the suppository-chamber 9, and the walls of said cavity merge into the walls of the suppository-chamber proper.

That portion of the bore 5 in which the plunger lies when retracted or drawn inward is exactly cylindrical, and the plunger fits snugly therein, while the inward convergence of the walls of the suppository-chamber terminate and merge into the cylindrical inner wall of the bore 5 in line with the knife-edge 12 of the plunger when the latter is drawn inward to its full extent.

Arranged behind the plunger is the plunger thrust-spring 13, which is contained within the bore of the handle and interposed between the spring-seat 6 and the inner end of the plunger 10, said spring acting to thrust the plunger outward into and partially through the suppository-chamber. In such reciprocatory movement of the plunger the latter is also given a partial rotary or oscillatory movement by means of a spiral slot or way 14, which is formed in the handle 1 and in which works a pin 15, projecting laterally from the plunger 10. The slot is of such length that its inner end coöperates with the pin 15 to stop or limit the movement of the plunger just as it reaches the inner end of the suppository-chamber proper, and the outer end of the slot 14 is so disposed that the outward movement of the plunger is checked before the extremity thereof reaches the extremity of the handle 1, as shown in Fig. 3, thus adapting the handle to form a protective covering or guard for the knife-edge 12 and prevent injury thereto. The pin 15 is preferably threaded at its inner end, as at 16, into a threaded socket in the plunger, as illustrated in Fig. 4, and is provided at its outer end with an operating-knob 17, preferably milled, as at 18, so as to provide a more effective grip for the fingers.

After the implement has been used as a pestle for grinding or pulverizing and mixing the contents of the mortar or other receptacle the implement is inverted and one of the fingers or the thumb is utilized to retract or draw inward the plunger against the tension of the spring 13. The implement is now pressed downward into the medicinal preparation and, if necessary, is repeatedly thrust into the mixture until such mixture or preparation has been pressed solidly into the suppository-chamber. After the suppository has thus been formed the knob 17 is released or the pressure thereon relieved, so as to allow the thrust-spring 13 to move the plunger outward, which has the effect of ejecting the suppository. The oscillatory or partial rotary movement of the plunger serves to break out or loosen the suppository and also to loosen and force outward any surplus material which may be left within the chamber 9 or which may adhere to the walls thereof adjacent to the wall of the plunger-receiving opening within the handle. In this way the implement is rendered self-clearing and is prevented from becoming choked by the material operated upon. All parts of the implement contained within the handle may be removed for cleansing and repair by removing the pin 15 and threaded spring-seat 6. The outer end of the screw-seat 6 lies perfectly flush with the convex outer surface of the pestle-head, and forms, in effect, a portion of the head and will not interfere with the grinding or pulverizing and mixing action of the head or cause any projection which would be injurious to the mortar or other receptacle in which the preparation is mixed. A small central longitudinal opening 19 extends through the plunger to insure the easy reciprocation of the plunger by avoiding the formation of a vacuum behind the plunger.

Instead of making the slot 14 in spiral form the said slot may be straight and arranged to extend longitudinally of the handle 1, as shown in Fig. 5. The slot may also be provided at its upper or inner end with a transversely-offset rest-notch 21, forming a rest-shoulder 22, against which the pin 15 will rest after the plunger has been retracted and partially rotated. This serves to hold the plunger retracted while the suppository-chamber is being filled.

From the foregoing it is thought that the construction, operation, and many advantages of the herein-described pharmaceutical implement will be readily apparent to those skilled in the art without further description, and it will be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. As an article of manufacture, a pharmaceutical implement comprising a hollow handle, one end of which is provided with a flared enlargement of the bore to form a suppository-chamber, an integral pestle-head at the other end thereof, and a plunger entirely housed within the handle and arranged to be projected within the flared suppository-chamber.

2. A pharmaceutical implement comprising a handle provided with an outwardly-flaring suppository-chamber, a plunger mounted therein, and means for imparting to the plunger a combined oscillatory and reciprocatory movement within the suppository-chamber.

3. A pharmaceutical implement comprising a handle having a spiral slot and provided with a suppository-chamber, a reciprocatory plunger working within said chamber, and a pin on said plunger working in the spiral slot.

4. A pharmaceutical implement comprising a handle having a spiral slot and provided with a suppository-chamber, a reciprocatory plunger working within said chamber, and a pin on said plunger working in the spiral slot and provided with an operating-knob.

5. A pharmaceutical implement comprising a handle having a spiral slot and also provided with a suppository-chamber, a reciprocatory plunger working within said chamber, a pin on said plunger working in the spiral slot, and a plunger thrust-spring mounted within the handle.

6. A pharmaceutical implement comprising a handle provided with a head at one end and a suppository-chamber at the opposite end, a reciprocatory plunger working within said chamber, a flush-seating removable spring-seat fitted in the head, and a plunger thrust-spring interposed between the plunger and spring-seat.

In testimony that I claim the foregoing as my own I have hereto affixed my signature in the presence of two witnesses.

GEO. LINCOLN ALLEN.

Witnesses:
W. D. HART,
WALTER R. SHAW.